(12) United States Patent
Mathews et al.

(10) Patent No.: US 11,326,366 B2
(45) Date of Patent: May 10, 2022

(54) FENCE VEGETATION BARRIER ASSEMBLY

(71) Applicants: Jay Mathews, Sheridan, IN (US); Trudy Paige, Sheridan, IN (US)

(72) Inventors: Jay Mathews, Sheridan, IN (US); Trudy Paige, Sheridan, IN (US)

( * ) Notice: Subject to any disclaimer, the term of this patent is extended or adjusted under 35 U.S.C. 154(b) by 29 days.

(21) Appl. No.: 16/942,423

(22) Filed: Jul. 29, 2020

(65) Prior Publication Data
US 2022/0034119 A1    Feb. 3, 2022

(51) Int. Cl.
*E04H 17/06* (2006.01)
*A01G 9/28* (2018.01)

(52) U.S. Cl.
CPC ............. *E04H 17/063* (2013.01); *A01G 9/28* (2018.02)

(58) Field of Classification Search
CPC ....... E04H 17/05; E04H 17/06; E04H 17/063; E04H 12/2261; E04H 17/20; E04H 17/006; E04H 17/22; E04H 17/23; E04H 17/009; A01G 9/28; A01K 15/006; E01F 15/0469
USPC ......................................... 256/65.14; 52/102
See application file for complete search history.

(56) References Cited

U.S. PATENT DOCUMENTS

| | | | | |
|---|---|---|---|---|
| 2,826,393 A * | 3/1958 | Miller | .................... | E04H 17/063 256/19 |
| 3,384,351 A * | 5/1968 | Turner, Jr. | ............. | E04H 17/063 256/32 |
| 3,393,897 A * | 7/1968 | Wright | .................. | E04H 17/063 256/32 |
| 3,500,593 A * | 3/1970 | Kwake | ..................... | E04H 15/22 52/2.14 |
| 3,515,373 A * | 6/1970 | Abbe | ........................ | A01G 9/28 256/32 |
| 3,704,004 A * | 11/1972 | Carter, Jr. | ............. | E04H 17/063 256/1 |
| 3,713,624 A | 1/1973 | Niemann | | |
| 3,745,701 A * | 7/1973 | Marvin | ..................... | A01G 9/28 47/33 |
| 3,806,096 A * | 4/1974 | Eccleston | ............. | E04H 17/063 256/32 |
| 3,822,864 A * | 7/1974 | Keys | ..................... | E04H 17/063 256/32 |
| 3,915,434 A * | 10/1975 | Lister | .................. | E01F 15/0469 256/59 |
| 4,321,769 A | 3/1982 | Tisbo | | |
| 4,349,989 A * | 9/1982 | Snider, Jr. | ............. | E04H 17/063 256/32 |

(Continued)

FOREIGN PATENT DOCUMENTS

| | | | |
|---|---|---|---|
| KR | 100872707 B1 | * | 12/2008 |
| KR | 101731767 B1 | * | 5/2017 |
| WO | WO2004003319 | | 1/2004 |

*Primary Examiner* — Matthew R McMahon (57) ABSTRACT

A fence vegetation barrier assembly for inhibiting vegetation from growing beneath a fence includes a plurality of panels that is each elongated. Each of the panels is positionable beneath a fence having each of the panels extending between a respective pair of fence posts to inhibit vegetation from growing beneath the fence. A plurality of first trim units is each coupled to a respective one of the panels. A plurality of second trim units is each coupled to a respective one of the panels. Each of the second trim units engages the first trim unit on an adjacent one of the panels when the panels are positioned beneath the fence to enhance the visual appeal of the fence posts.

7 Claims, 9 Drawing Sheets

(56) References Cited

U.S. PATENT DOCUMENTS

| | | | | |
|---|---|---|---|---|
| 4,497,472 | A | * | 2/1985 | Johnson ................ E04H 17/063 256/1 |
| 5,285,594 | A | * | 2/1994 | Penny ................. E01F 15/0469 256/32 |
| 5,586,753 | A | * | 12/1996 | Michiaels ................ A01G 9/28 256/32 |
| 5,660,374 | A | | 8/1997 | Dayberry |
| 5,711,106 | A | * | 1/1998 | Ellis ......................... A01G 9/28 47/32 |
| 5,832,675 | A | * | 11/1998 | Zuares ................ E04H 12/2292 52/60 |
| 5,901,526 | A | * | 5/1999 | Vidmar .............. E04H 12/2215 52/745.09 |
| 6,070,859 | A | | 6/2000 | Damon |
| 6,257,557 | B1 | * | 7/2001 | Anderson ........... E01F 15/0469 256/1 |
| 6,305,670 | B1 | * | 10/2001 | Ward .................. E04F 11/1842 256/59 |
| 6,527,255 | B2 | * | 3/2003 | O'Berry ............... E04H 17/063 256/1 |
| 6,837,487 | B1 | * | 1/2005 | Oden ................... E04H 17/063 256/1 |
| 7,104,525 | B2 | * | 9/2006 | Ricci ................... E04H 12/2292 256/1 |
| D558,903 | S | | 1/2008 | Purvis |
| 9,719,273 | B2 | | 8/2017 | Raab |
| 10,428,551 | B1 | * | 10/2019 | Bloomfield .......... E04H 17/063 |
| 10,457,481 | B2 | * | 10/2019 | Medina Casado .... E01F 15/141 |
| 2004/0000665 | A1 | | 1/2004 | Himmelreich |

\* cited by examiner

FENCE VEGETATION BARRIER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to barrier devices and more particularly pertains to a new barrier device for inhibiting vegetation from growing beneath a fence.

(2) Description of Related Art Including Information Disclosed Under 37 CFR 1.97 and 1.98

The prior art relates to barrier devices including a barrier that is positionable beneath a fence for inhibiting vegetation growth that includes a vertical portion and a horizontal portion. The prior art discloses a vegetation barrier that includes a dome portion and a penetrating portion which penetrates ground to secure the dome portion to the ground. The prior art discloses a vegetation barrier that extends between fence poles in a fence which includes a notch therein for receiving a bottom edge of the fence. The prior art discloses a variety of vegetation barriers that are positionable beneath a fence and which have a dome-like shape. The prior art discloses a vegetation barrier that includes a tubular portion for engaging a bottom edge of a fence and a pair of wings extending away from the tubular portion to cover ground beneath the fence.

BRIEF SUMMARY OF THE INVENTION

An embodiment of the disclosure meets the needs presented above by generally comprising a plurality of panels that is each elongated. Each of the panels is positionable beneath a fence having each of the panels extending between a respective pair of fence posts to inhibit vegetation from growing beneath the fence. A plurality of first trim units is each coupled to a respective one of the panels. A plurality of second trim units is each coupled to a respective one of the panels. Each of the second trim units engages the first trim unit on an adjacent one of the panels when the panels are positioned beneath the fence to enhance the visual appeal of the fence posts.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new barrier device embodying the principles and concepts of an embodiment of the disclosure and generally designated by the reference numeral 10 will be described.

As best illustrated in FIGS. 1 through 10, the fence vegetation barrier assembly 10 generally comprises a plurality of panels 12 that is each positionable beneath a fence 14 having each of the panels 12 extending between a respective pair of fence posts 16. In this way each of the panels 12 inhibits vegetation from growing beneath the fence 14. Each of the panels 12 is comprised of a rigid material and each of the panels 12 is comprised of a fluid impermeable material.

Each of the panels 12 has a first end 18, a second end 20 and an outer surface 22 extending therebetween. Each of the panels 12 is elongated between the first end 18 and the second end 20, and the outer surface 22 has a top side 24 and a bottom side 26. The bottom side 26 rests on the ground having each of the first end 18 and the second end 20 being positioned adjacent to a respective one of the pair of fence posts 16.

A plurality of first trim units 28 is provided and each of the first trim units 28 is coupled to a respective one of the panels 12. Each of the first trim units 28 is aligned with the first end 18 of the respective panel. Additionally, each of the first trim units 28 extends partially around a respective fence post 16 having the fence post 16 standing on the top side 24 of the outer surface 22 of the panel. Each of the first trim units 28 comprises a central section 30 extending between a pair of end sections 32. Each of the end sections 32 is oriented perpendicular to the central section 30 such that first trim units 28 have a u-shape.

The central section 30 and each of the end sections 32 has a first surface 34 extending upwardly from the panel 12, a second surface 36 angling upwardly from the first surface 34 and a third surface 38 angling away from the second surface 36. The third surface 38 lies on a plane that is oriented parallel to the top side 24 of the outer surface 22 of the panel. Additionally, the second surface 36 slopes toward the first end 18 of the panel. Each of the end sections 32 has a distal end 40 with respect to the central section 30 and the distal end 40 of each of the end sections 32 angles toward the central section 30. Moreover, the distal end 40 of each of the end sections 32 is aligned with the first end 18 having the central section 30 being oriented parallel to the first end 18.

A plurality of first engagements 42 is each coupled to a respective one of the first trim units 28. Each of the first engagements 42 is positioned on a respective one of the end sections 32 of the respective first trim unit 28. Additionally, each of the first engagements 42 extends beyond the distal end 40 of the respective end section 32.

A plurality of second trim units 44 is each coupled to a respective one of the panels 12 and each of the second trim units 44 is aligned with the second end 20 of the respective panel. Each of the second trim units 44 engages the first trim unit 28 on an adjacent one of the panels 12 when the panels 12 are positioned beneath the fence 14. Thus, each of the first trim units 28 and each of the second trim units 44 surround the fence post 16 for enhancing visual appeal of the fence posts 16.

Each of the second trim units 44 comprises a middle section 46 extending between a pair of outward sections 48. Each of the outward sections 48 is oriented perpendicular to the middle section 46 such that second trim units 44 have a u-shape. The middle section 46 and each of the outward sections 48 has a primary surface 50 extending upwardly from the panel 12, a secondary surface 52 angling upwardly from the second surface 36 and a tertiary surface 54 angling away from the secondary surface 52. The tertiary surface 54 lies on a plane that is oriented parallel to the top side 24 of the outer surface 22 of the panel. The secondary surface 52 slopes toward the second end 20 of the panel.

Each of the outward sections 48 has a distal end 56 with respect to the middle section 46. The distal end 56 of each of the outward sections 48 angles away from the middle section 46. Moreover, the distal end 56 of each of the outward sections 48 is aligned with the second end 20. The distal end 56 of each of the outward sections 48 abuts the distal end 40 of a respective one of the end sections 32 of the first trim unit 28 on the adjacent panel 12.

A plurality of second engagements 58 is each coupled to a respective one of the second trim units 44. Each of the second engagements 58 is positioned on a respective one of the outward sections 48 of the respective second trim unit 58 and each of the second engagements 58 extends beyond the distal end 56 of the respective outward section 48. Additionally, each of the first engagements 42 releasably engages the second trim unit 44 and each of the second engagements 58 releasably engages the first trim unit 28.

Figure 1:
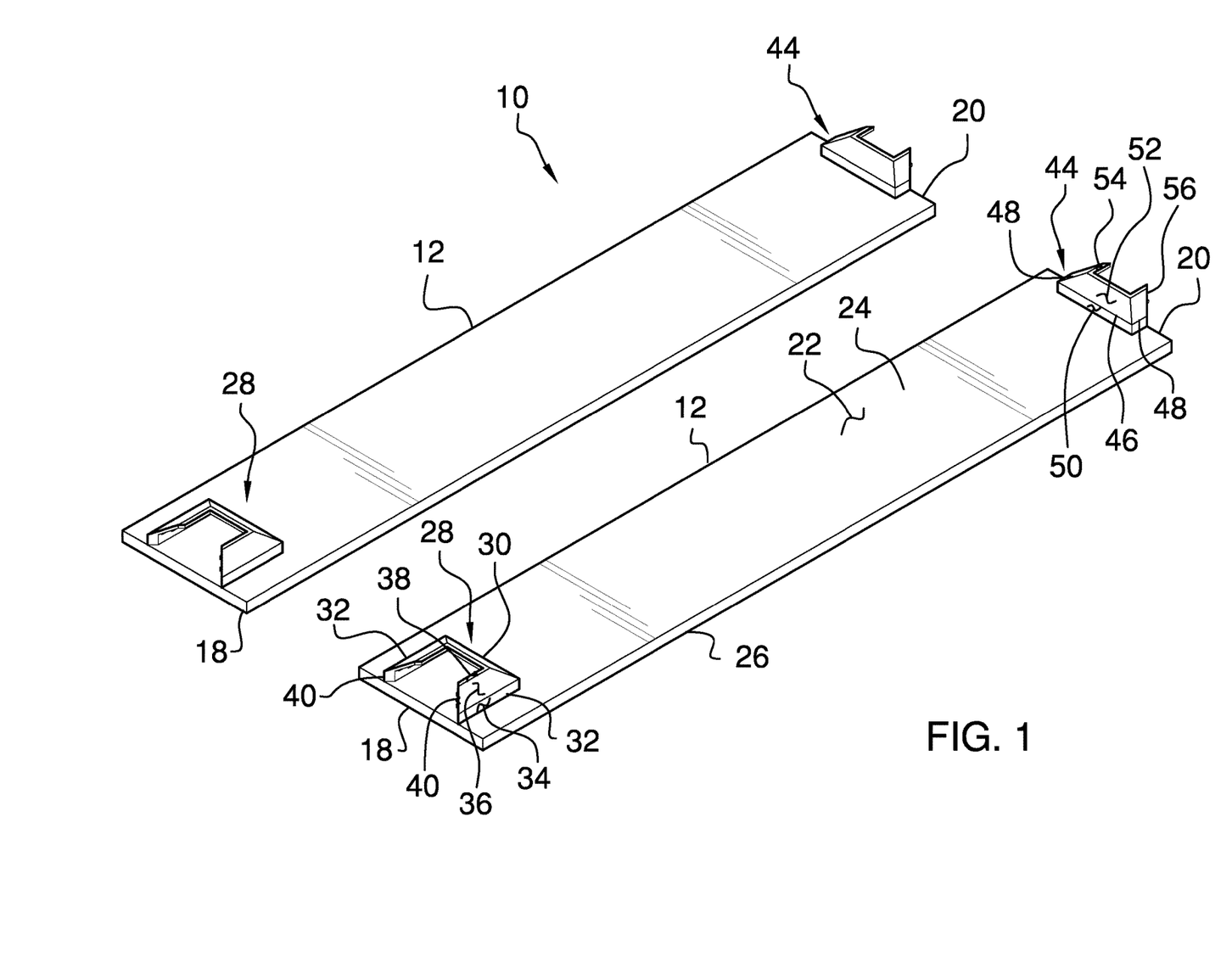
FIG. 1 is a top perspective view of a fence vegetation barrier assembly according to an embodiment of the disclosure.
Figure 2:
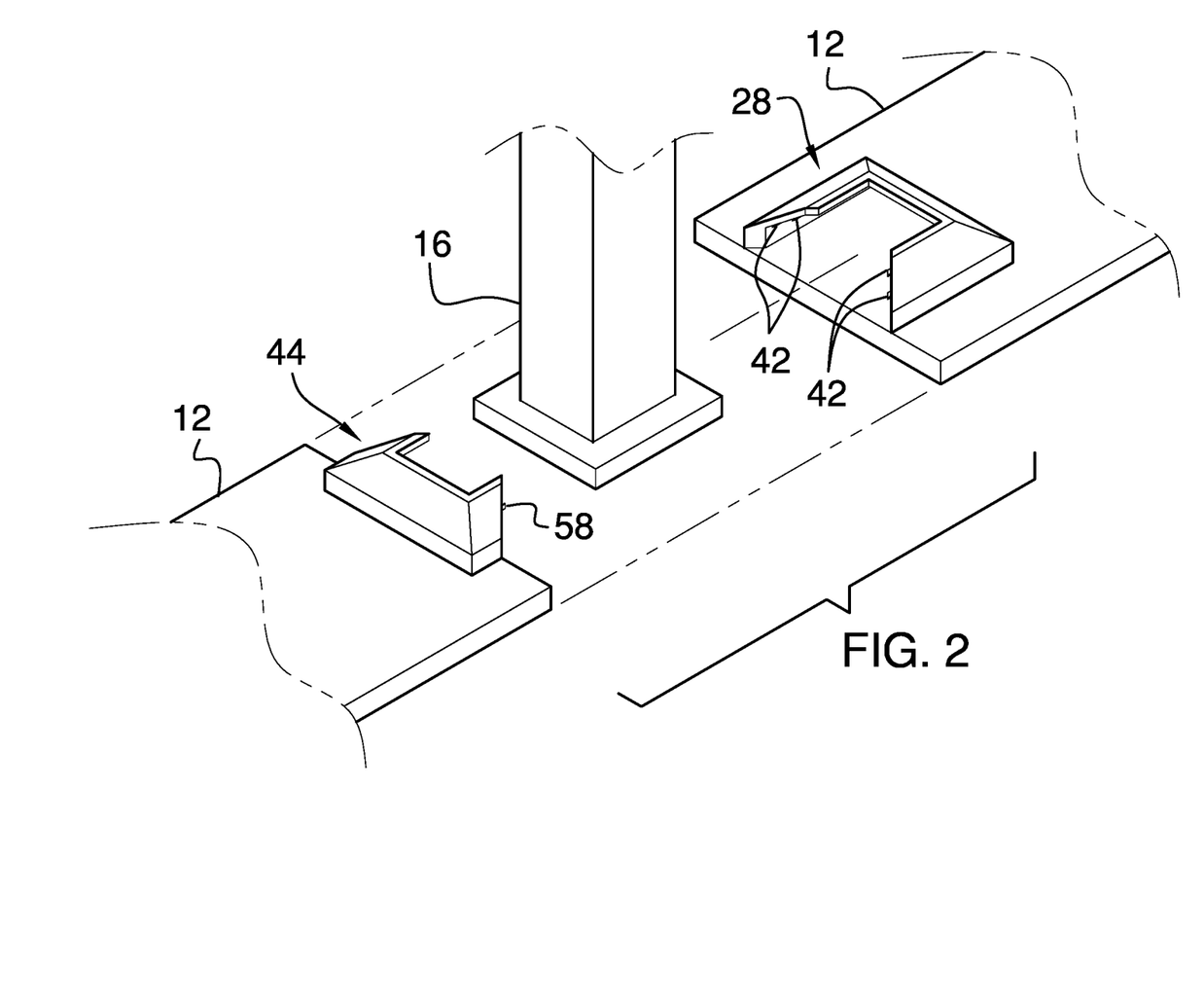
FIG. 2 is a top perspective in-use view of an embodiment of the disclosure.
Figure 3:
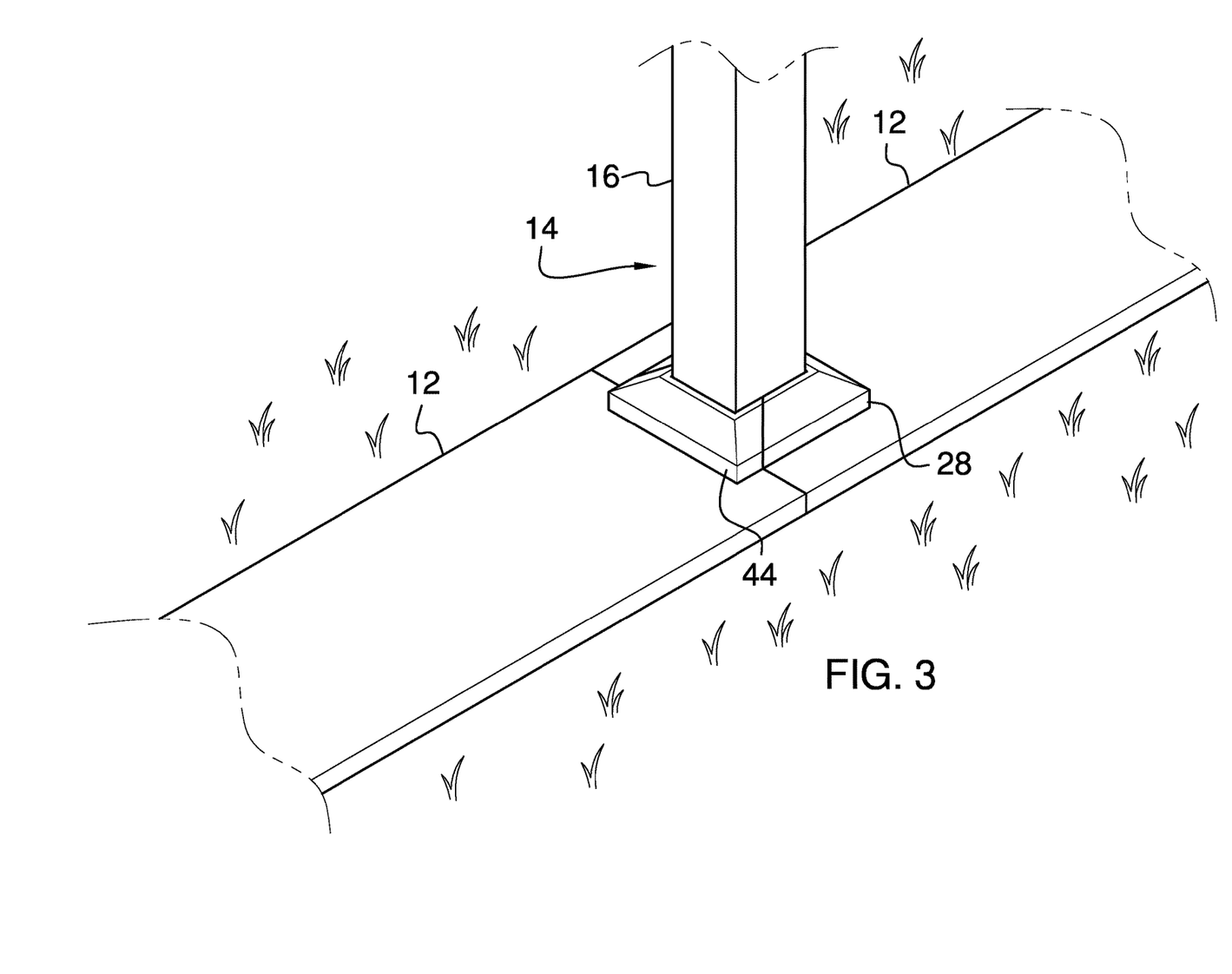
FIG. 3 is a perspective in-use view of an embodiment of the disclosure.
Figure 4:
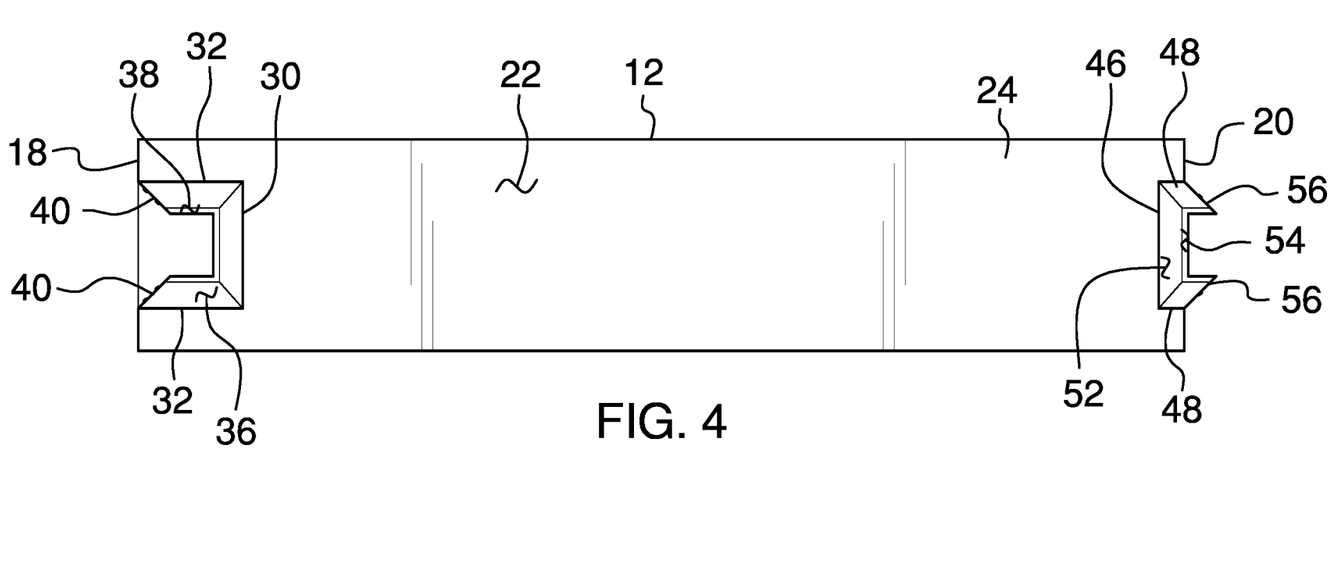
FIG. 4 is a top view of an embodiment of the disclosure.
Figure 5:
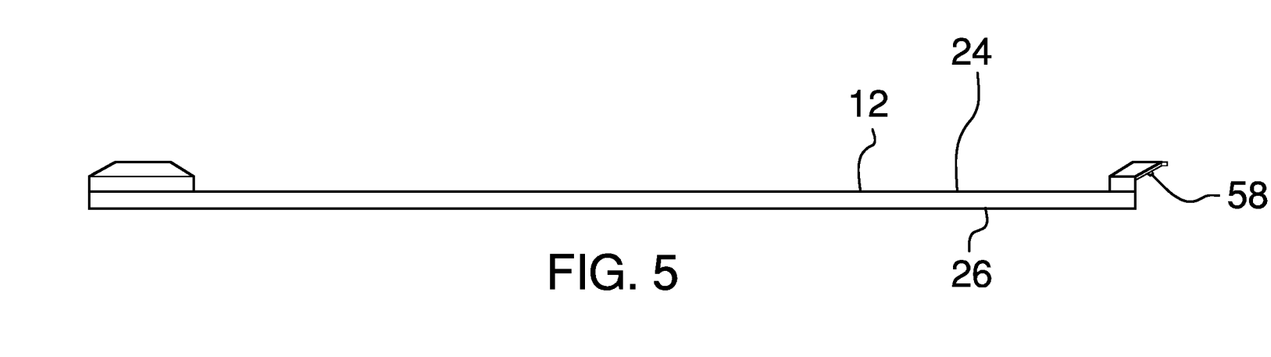
FIG. 5 is a front view of an embodiment of the disclosure.
Figure 6:
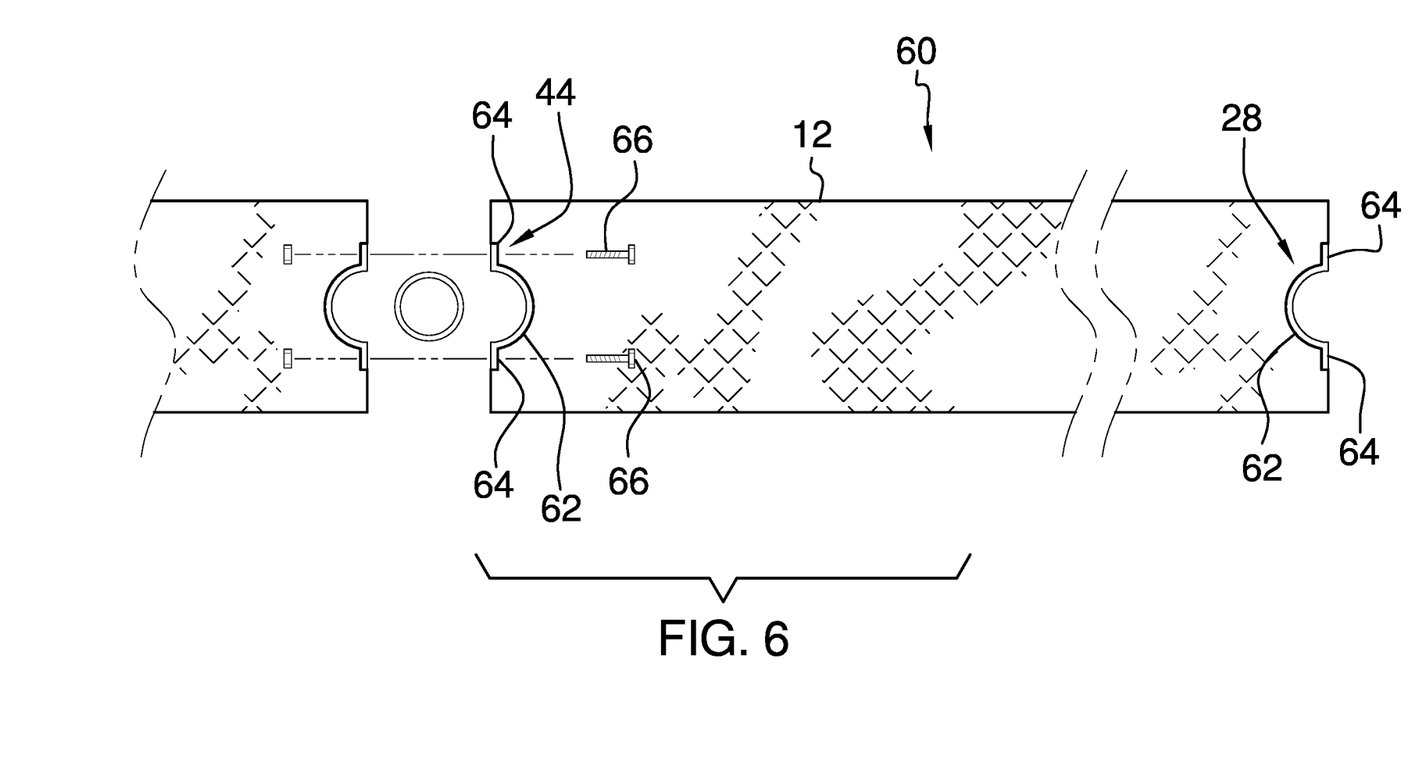
FIG. 6 is a top view of an alternative embodiment of the disclosure.
Figure 7:
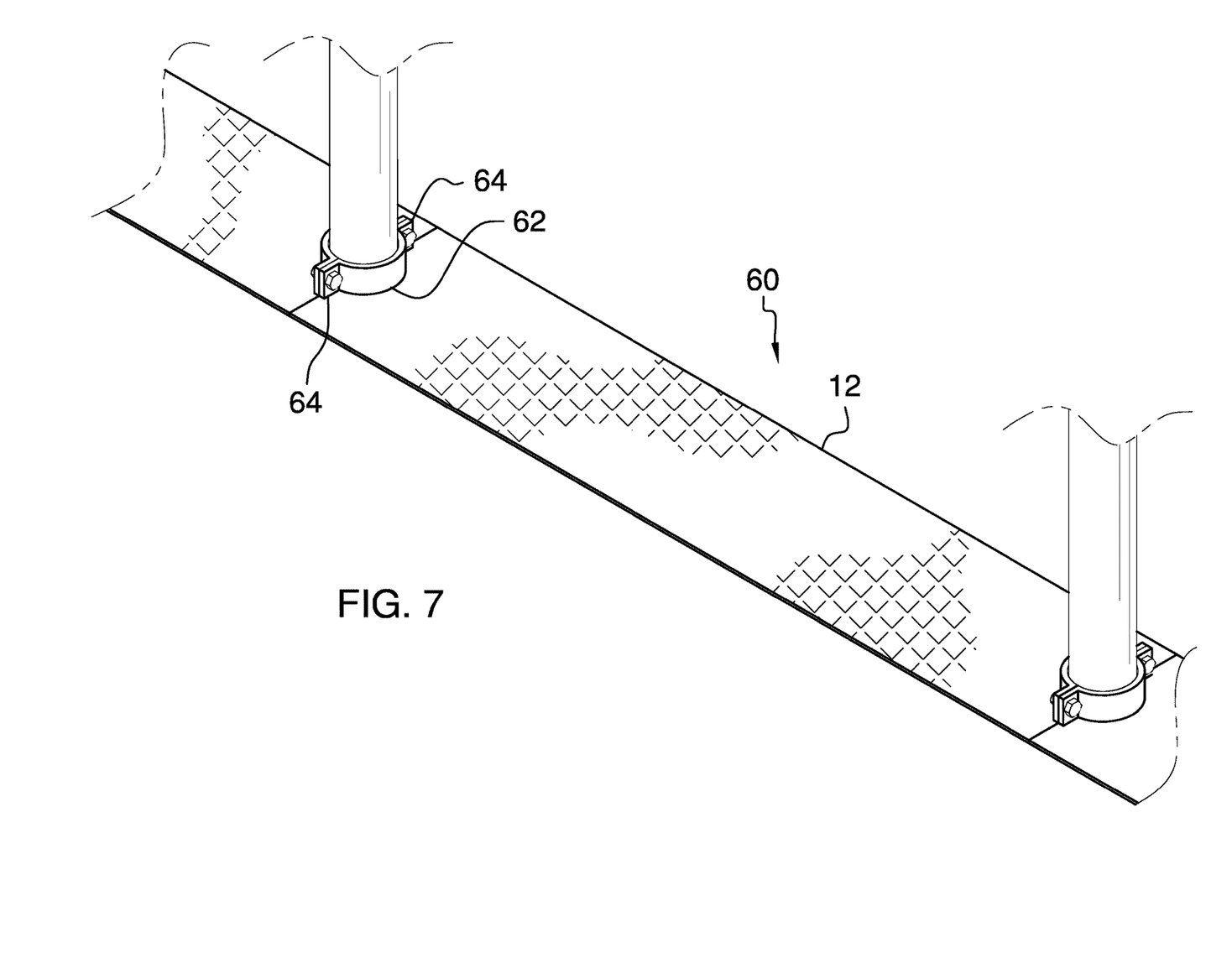
FIG. 7 is a perspective in-use view of an alternative embodiment of the disclosure.

In an alternative embodiment 60 as is most clearly shown in FIGS. 6 and 7, each of the first trim units 28 and the second trims units 44 comprises a collar 62 that has a pair of tabs 64 each extending in opposite directions from the collar 62. The collar 62 is concavely arcuate between the tabs 64. In this way the collar 62 can extend around a fence pole 66 having the tabs 64 associated with the first trim unit 28 abutting the tabs 64 associated with the second trim unit 55. A pair of fasteners 66 is each extendable through a respective one of the tabs 64 associated with the first trim unit 28 to engage a respective one of the tabs 64 associated with the second trim unit 44. The fasteners 66 may comprise a nut and a bolt or other similar type of releasable fastener.

Figure 8:
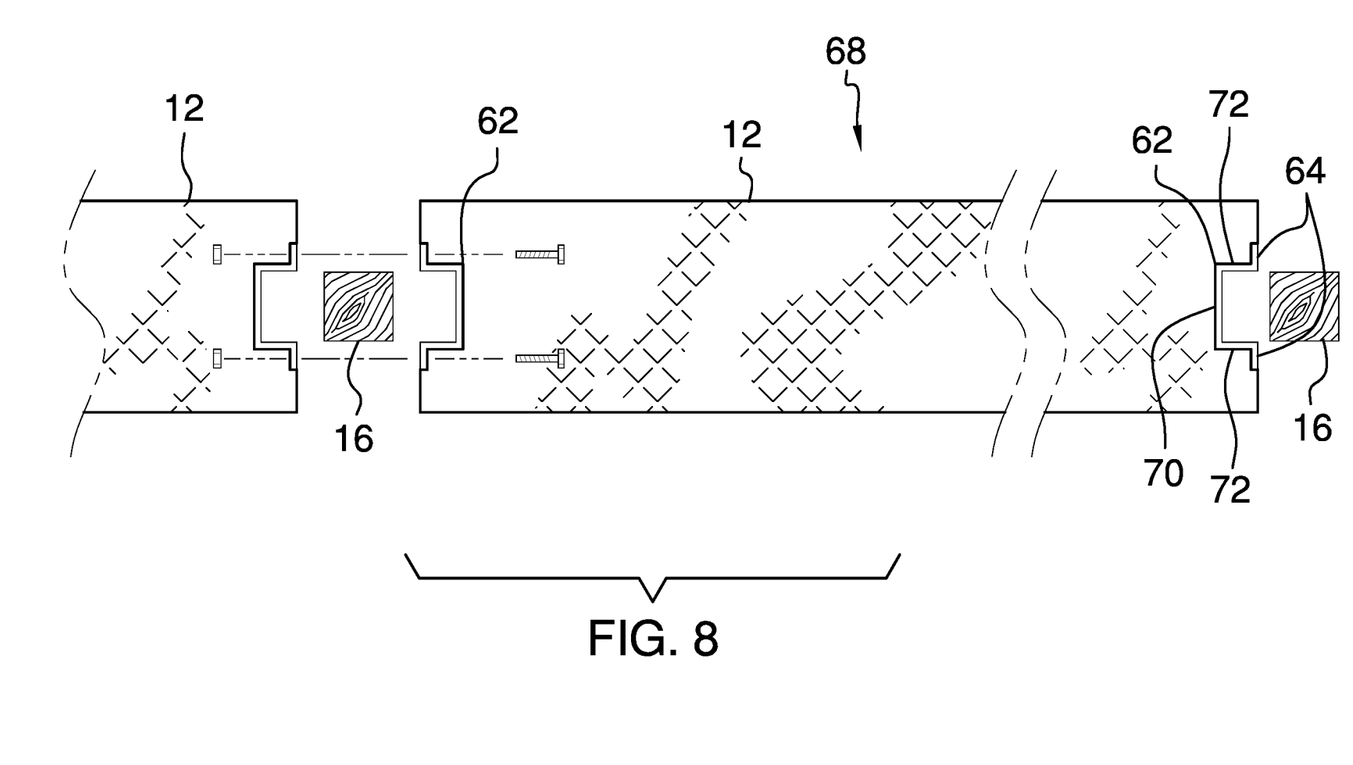
FIG. 8 is a top view of an alternative embodiment of the disclosure.
Figure 9:
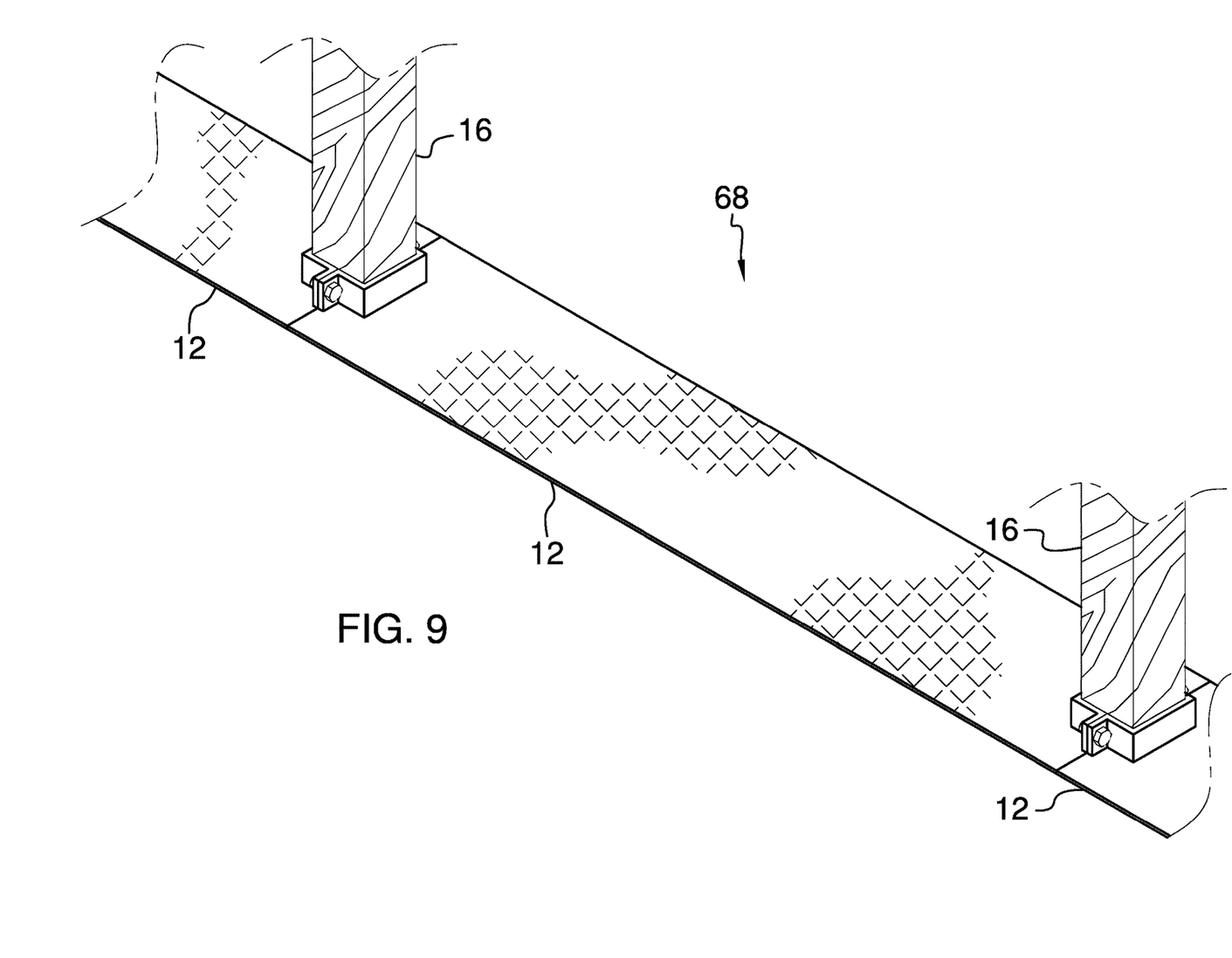
FIG. 9 is a perspective in-use view of an alternative embodiment of the disclosure.
Figure 10:
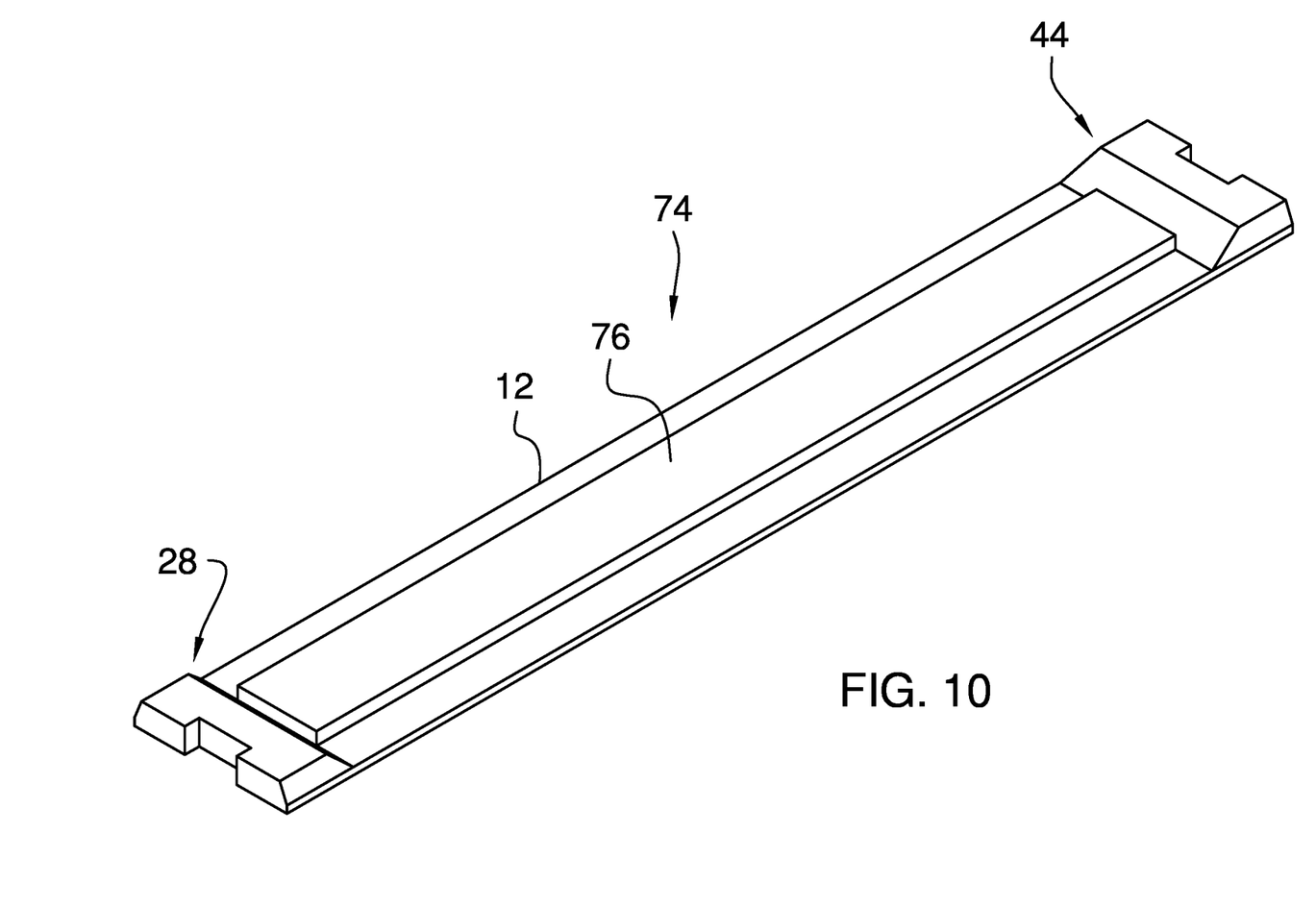
FIG. 10 is a perspective view of an alternative embodiment of the disclosure.

In an alternative embodiment 68 as is most clearly shown in FIGS. 8 and 9, the collar 62 comprises a central member 70 extending between a pair of end members 72 such that the collar 62 has a rectilinear shape. In this way the collar 62 is facilitated to accommodate a square fence post 16. In an alternative embodiment 74 as is shown in FIG. 10, each of the panels 12 may have a prominence 76 thereon that extends between the first trim unit 28 and the second trim unit 44.

In use, each of the panels 12 is laid on the ground to extend between respective pairs of fence posts 16. The first trim unit 28 on each panel 12 engages the second trim unit 44 on an adjacent panel 12. In this way the plurality of panels 12 inhibit vegetation from growing beneath the fence 14. Additionally, the first trim unit 28 and the second trim unit 44 enhance the ornamental appearance of the fence posts 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A fence vegetation barrier assembly inhibiting the growth of vegetation beneath a fence, said assembly comprising:
   a plurality of panels, each of said panels being elongated, each of said panels being positionable beneath the fence having each of said panels extending between a respective pair of fence posts wherein each of said panels is configured to inhibit vegetation from growing beneath the fence;

a plurality of first trim units, each of said first trim units being coupled to a respective one of said panels, each of said first trim units being aligned with a first end of said respective panel, each of said first trim units extending partially around a respective fence post having the fence post standing on a top side of said outer surface of said panel;

a plurality of second trim units, each of said second trim units being coupled to a respective one of said panels, each of said second trim units being aligned with a second end of said respective panel, each of said second trim units engaging said first trim unit on an adjacent one of said panels when said panels are positioned beneath the fence, each of said first trim units and each of said second trim units surrounding the fence post for enhancing visual appeal of the fence posts;

wherein each of said second trim units comprises a middle section extending between a pair of outward sections, each of said outward sections being oriented perpendicular to said middle section such that each of said second trim units has a u-shape, said middle section and each of said outward sections having a primary surface extending upwardly from said panel, a secondary surface angling upwardly from said primary surface and a tertiary surface angling away from said secondary surface, said tertiary surface lying on a plane being oriented parallel to said top side of said outer surface of said panel, said secondary surface sloping toward said second end of said panel;

wherein each of said first trim units comprises a central section extending between a pair of end sections, each of said end sections having a distal end with respect to said central section; and wherein each of said outward sections has a distal end with respect to said middle section, said distal end of each of said outward sections angling away from said middle section, said distal end of each of said outward sections being aligned with said second end, said distal end of each of said outward sections abutting said distal end of a respective one of said end sections of said first trim unit on said adjacent panel.

2. The assembly according to claim 1, wherein each of said panels has h first end, the second end and the outer surface extending therebetween, each of said panels being elongated between said first end and said second end, said outer surface having a top side and a bottom side, said bottom side resting on the ground having each of said first end and said second end being positioned adjacent to a respective one of the pair of fence posts.

3. The assembly according to claim 2, wherein each of said end sections being oriented perpendicular to said central section such that each of said first trim units has a u-shape, said central section and each of said end sections having a first surface extending upwardly from said panel, each of said end sections having a second surface angling upwardly from said first surface and a third surface angling away from said second surface, said third surface lying on a plane being oriented parallel to said top side of said outer surface of said panel, said second surface sloping toward said first end of said panel.

4. The assembly according to claim 1, further comprising:
a plurality of first engagements, each of said first engagements being coupled to a respective one of said first trim units, each of said first engagements being positioned on a respective one of said end sections of said respective trim unit, each of said first engagements extending beyond said distal end of said respective end section; and a plurality of second engagements, each of said second engagements being coupled to a respective one of said second trim units, each of said second engagements being positioned on a respective one of said outward sections of said respective trim unit, each of said second engagements extending beyond said distal end of said respective end section, each of said first engagements releasably engaging said second trim unit, each of said second engagements releasably engaging said first trim unit.

5. A fence vegetation barrier assembly inhibiting the growth of vegetation beneath a fence, said assembly comprising:

a plurality of panels, each of said panels being elongated, each of said panels being positionable beneath the fence having each of said panels extending between a respective pair of fence posts wherein each of said panels is configured to inhibit vegetation from growing beneath the fence;

a plurality of first trim units, each of said first trim units being coupled to a respective one of said panels, each of said first trim units being aligned with a first end of said respective panel, each of said first trim units extending partially around a respective fence post having the fence post standing on a top side of said outer surface of said panel;

a plurality of second trim units, each of said second trim units being coupled to a respective one of said panels, each of said second trim units being aligned with a second end of said respective panel, each of said second trim units engaging said first trim unit on an adjacent one of said panels when said panels are positioned beneath the fence, each of said first trim units and each of said second trim units surrounding the fence post for enhancing visual appeal of the fence posts;

wherein each of said first trim units comprises a central section extending between a pair of end sections, each of said end sections being oriented perpendicular to said central section such that each of said first trim units has a u-shape, said central section and each of said end sections having a first surface-extending upwardly from said panel, each of said end sections having a second surface angling upwardly from said first surface and a third surface angling away from said second surface, said third surface lying on a plane being oriented parallel to said top side of said outer surface of said panel, said second surface sloping toward said first end of said panel; and wherein each of said first trim units comprises a central section extending between a pair of end sections, each of said end sections being oriented perpendicular to said central section such that first trim units has a u-shape, said central section and each of said end sections having a first surface extending upwardly from said panel, each of said end sections having a second surface angling upwardly from said first surface and a third surface angling away from said second surface, said third surface lying on a plane being oriented parallel to said top side of said outer surface of said panel, said second surface sloping toward said first end of said panel; and wherein each of said end sections has a distal end with respect to said central section, said distal end of each of said end sections angling toward said central section, said distal end of each of said end sections being aligned with said first end having said central section being oriented parallel to said first end.

6. The assembly according to claim 5, further comprising a plurality of first engagements, each of said first engagements being coupled to a respective one of said first trim units, each of said first engagements being positioned on a respective one of said end sections of said respective trim unit, each of said first engagements extending beyond said distal end of said respective end section.

7. A fence vegetation barrier assembly inhibiting the growth of vegetation beneath a fence, said assembly comprising:
- a plurality of panels, each of said panels being elongated, each of said panels being positionable beneath the fence having each of said panels extending between a respective pair of fence posts wherein each of said panels is configured to inhibit vegetation from growing beneath the fence, each of said panels having a first end, a second end and an outer surface extending therebetween, each of said panels being elongated between said first end and said second end, said outer surface having a top side and a bottom side, said bottom side resting on the ground having each of said first end and said second end being positioned adjacent to a respective one of the pair of fence posts;
- a plurality of first trim units, each of said first trim units being coupled to a respective one of said panels, each of said first trim units being aligned with said first end of said respective panel, each of said first trim units extending partially around a respective fence post having the fence post standing on said top side of said outer surface of said panel, each of said first trim units comprising a central section extending between a pair of end sections, each of said end sections being oriented perpendicular to said central section such that each of said first trim units has a u-shape, said central section and each of said end sections having a first surface extending upwardly from said panel, a second surface angling upwardly from said first surface and a third surface angling away from said second surface, said third surface lying on a plane being oriented parallel to said top side of said outer surface of said panel, said second surface sloping toward said first end of said panel, each of said end sections having a distal end with respect to said central section, said distal end of each of said end sections angling toward said central section, said distal end of each of said end sections being aligned with said first end having said central section being oriented parallel to said first end;
- a plurality of first engagements, each of said first engagements being coupled to a respective one of said first trim units, each of said first engagements being positioned on a respective one of said end sections of said respective trim unit, each of said first engagements extending beyond said distal end of said respective end section;
- a plurality of second trim units, each of said second trim units being coupled to a respective one of said panels, each of said second trim units being aligned with said second end of said respective panel, each of said second trim units engaging said first trim unit on an adjacent one of said panels when said panels are positioned beneath the fence, each of said first trim units and each of said second trim units surrounding the fence post for enhancing visual appeal of the fence posts, each of said second trim units comprising a middle section extending between a pair of outward sections, each of said outward sections being oriented perpendicular to said middle section such that each of said second trim units has a u-shape, said middle section and each of said outward sections having a primary surface extending upwardly from said panel, a secondary surface angling upwardly from said primary surface and a tertiary surface angling away from said secondary surface, said tertiary surface lying on a plane being oriented parallel to said top side of said outer surface of said panel, said secondary surface sloping toward said second end of said panel, each of said outward sections having a distal end with respect to said middle section, said distal end of each of said outward sections angling away from said middle section, said distal end of each of said outward sections being aligned with said second end, said distal end of each of said outward sections abutting said distal end of a respective one of said end sections of said first trim unit on said adjacent panel;
- a plurality of second engagements, each of said second engagements being coupled to a respective one of said second trim units, each of said second engagements being positioned on a respective one of said outward sections of said respective trim unit, each of said second engagements extending beyond said distal end of said respective end section, each of said first engagements releasably engaging said second trim unit, each of said second engagements releasably engaging said first trim unit.

\* \* \* \* \*